June 25, 1968 J. Z. CERYCH ET AL 3,390,026
PROCESS OF FORMING A PROTECTIVE COATING ON PARTICULATE
MATERIAL, AND COATED ARTICLE OBTAINED THEREBY
Filed Nov. 25, 1960

United States Patent Office 3,390,026
Patented June 25, 1968

3,390,026
PROCESS OF FORMING A PROTECTIVE COATING ON PARTICULATE MATERIAL, AND COATED ARTICLE OBTAINED THEREBY
John Z. Cerych, Methuen, and Allen L. Klibanoff, Boston, Mass., assignors, by mesne assignments, to National Research Corporation, Cambridge, Mass., a corporation of Massachusetts
Filed Nov. 25, 1960, Ser. No. 71,579
10 Claims. (Cl. 149—5)

This invention relates to coatings and films and more particularly to protective coatings on a wide variety of materials.

It is a principal object of the present invention to provide a protective coating on particulate material without adversely affecting the properties thereof.

A further object of the invention is to provide a method of producing a protective coating on a variety of materials to provide stability to ambient air and moisture.

A still further object of the invention is to provide a method of encapsulating various materials with a protective coating to provide compatibility and mechanical stability with other materials.

Other objects of the invention will in part be obvious and will in part appear hereinafter.

The invention accordingly comprises the product possessing the features, properties and the relation of components and the process involving the several steps and the relation and the order of one or more of such steps with respect to each of the others which are exemplified in the following detailed disclosure, and the scope of the application of which will be indicated in the claims.

Figure 1:
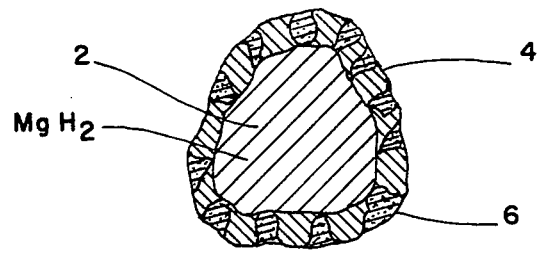
Figure 2:
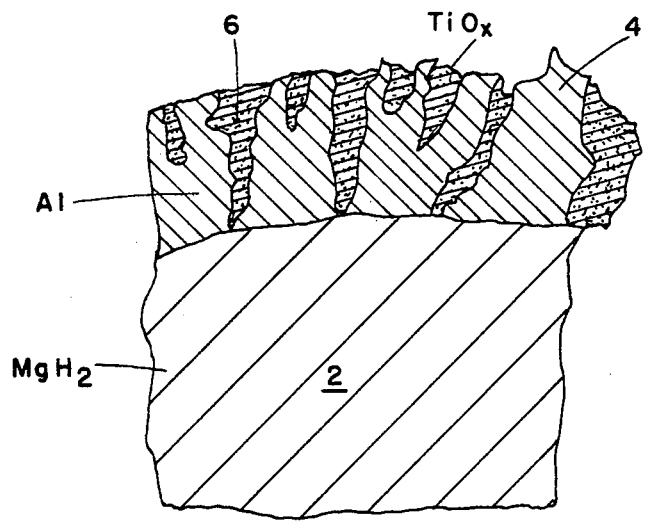

Briefly stated, the invention is directed to a process of producing a protective coating on substrates which are highly sensitive to various ambient conditions and comprises vacuum-depositing a metallic coating on said material and then increasing the imperviousness of the metal coating by application of a sealant to the pores of the metal coating. For a more complete understanding of the nature of the invention, reference should be had to the following detailed description taken in connection with the accompanying drawings wherein:

FIG. 1 is an enlarged diagrammatic, schematic, representation of the invention as applied to a particle of magnesium hydride; and FIG. 2 is a greatly enlarged diagrammatic, schematic sectional view of FIG. 1.

Since the apparatus for carrying out the vacuum deposition of the metallic film forms no part of the present invention, it will be described only sufficiently to understand the nature of the present invention. A more detailed description of a preferred apparatus for carrying out the metal coating may be had by reference to the copending application of Cerych et al., Ser. No. 795,424, filed Feb. 25, 1959, now abandoned.

In carrying out the present invention the material to be coated may be introduced by external means into a vacuum coating chamber for continuous coating or may be initially placed within the coating chamber for batch-type operations. The vacuum coating chamber is evacuated to a low pressure (in the range of $1 \times 10^{-4}$ mm. Hg abs. to $1 \times 10^{-2}$ mm. Hg abs.) the exact pressure depending on the metal to be evaporated, its vapor pressure and temperature.

Where the material to be coated has a vapor pressure or decomposition pressure at a temperature which can be reached during coating, the material is preferably pre-cooled to a sufficiently low temperature to avoid decomposition or vaporization. During coating heat is transferred by radiation from the evaporation source and also transferred by the heat of condensation of the metal vapors.

In a well designed evaporation source, the heat transferred by radiation is small compared to the heat transferred by heat of condensation of the evaporated metal. Therefore, the major factor in determining the temperature of the material being coated is the heat of condensation.

As the vaporization of the coating metal takes place, the vapors are directed towards the particulate material to be coated as it is advanced through the coating zone. In a preferred embodiment of apparatus of the type described in the above mentioned application of Cerych et al., the particulate material is advanced through the coating zone by a vibrating feeder platform which is also preferably equipped with means to cool heat sensitive particulate materials. By regulating the rate of advancement and vibration of the particulate material and taking into account the rate of evaporation and the mean free path of the coating vapors at specific temperatures and pressures, a coating of a desired depth is obtained. When the desired amount of metal has been deposited, the coated particulate material is removed and further treated in accordance with the present invention.

While a high degree of protection is afforded by a metal coating on the order of a few microns thick (one micron-$3.937 \times 10^{-5}$ inch) the protection is not complete since the coatings have been found to be somewhat porous. The porosity is believed to result primarily from the type of film which results from the condensation of metal vapors onto the relatively cold surface of the particulate material. This metal coating is of a powdery or columnar structure rather than a dense continuous structure.

The degree of porosity can be substantially reduced by increasing the thickness of the metal coating though it is not completely eliminated.

Accordingly, in order to reduce the porosity of the metal coating and achieve the desired protection of the coated particulate material, the present invention contemplates the further step of sealing the pores of the metal coating.

The sealing process preferably contemplates plugging the pores of the coating with a solid such as a metallic oxide. To form the necessary oxide plug a reactive material metal compound such as a metal alkyl is deposited in the pores. In a preferred example the metal alkyl is an alkyl titanate which is dissolved in a suitable solvent and the porous metallic coating is treated with this solution. This has the effect of providing penetration of the titanate into the innermost portions of the coating pores.

After the porous surface has been treated as above, the solvent is preferably removed by evaporation. The remaining alkyl titanate is then reacted by exposure to a warm moist gas for example, moist air or an inert gas which contains water vapor, to convert the alkoxy groups to oxy and hydroxy groups with the subsequent conversion of the hydroxy groups at least partially to oxide. This has the result, with an alkyl titanate, of forming an oxide of titanium. The alkyl group is believed to be converted to the corresponding alcohol which is volatilized by the heat of the warm moist gas. When necessary more heat may be applied to vaporize such alcohol byproducts, but such additional heating should not be so high as to adversely affect the metal coated substrate. The sealing process may be sequentially repeated until the desired degree of protection is obtained. The number of times the sealing process is repeated is a function of the concentration of the sealant solution, the porosity of the metal coating and the degree of protection desired.

Numerous other materials can be utilized for plugging the spaces in the relatively porous metallic film which is vacuum deposited on the particulate material to be protected. Other organic titanates, zirconates and silicates can be employed as well as halides of the metals and even the nonmetals such as silicon and the like. The basic requirement for the present invention is that the vacuum deposited metallic film be relatively effective as a protective coating even though it be somewhat porous. The other requirement is that the sealing agent be one which can be applied as a liquid or solution so as to permit complete penetration of the sealant into the pores of the porous vacuum deposited coating. Several other important characteristics of the sealant are that it can be converted into a solid oxide, hydroxide or other relatively inert plugging material by a treatment which will not damage the porous deposited metallic coating of the particulate substrate material. Additionally, the sealant (upon conversion) should not produce reaction byproducts which adversely affect the substrate or the deposited metal coating on the substrate material.

An organic solution of an alkyl titanate is particularly suitable since it permits formation of a solution with a readily volatilizable solvent to assure full penetration of the coating pores and ample removal of the solvent. The alkyl titanate is readily hydrolized to a non-soluble titanium oxide which forms a dense tenacious plug for the pores in the aluminum coating.

In order to visualize the invention with somewhat more clarity, reference should be had to FIGURES 1 and 2 of the drawing. FIG. 1 is an enlarged diagrammatic, schematic representation of the invention as applied to a particles of magnesium hydride. FIG. 2 is a greatly enlarged, schematic diagrammatic, sectional view of a portion of FIG. 1. In FIG. 2 a small section of the particulate material, for example, a 300 mesh grain of magnesium hydride, is illustrated at 2. This has vacuum deposited on its surface a film of aluminum 4, this film being on the order of 1 micron thick and having numerous fissures and cracks resulting from the columnar growth of the aluminum deposit due to the necessity of maintaining the growing aluminum film at a low temperature because of the heat sensitivity of the substrate material (magnesium hydride). These fissures and pores are illustrated as being plugged with an oxide of titanium which is believed to be polymeric titanium oxide and which is schematically denoted as $TiO_x$.

The invention will now be described by specific non-limiting examples.

Example 1

Cylindrical pellets of lithium aluminum hydride ⅛ inch in diameter and ⅛ inch high were coated by vacuum depositing with 4.5% aluminum metal by weight corresponding to a coating thickness of between about 3 to 10 microns. The $LiAlH_4$ pellets were precooled to a temperature of −60° C. and maintained at a temperature of between −60 and 60° C. during the coating operation. The aluminum metal coating was then sealed as follows: a 5% solution of tetraisopropyl titanate in hexane was applied to the coating by dipping the aluminum coated pellets into the solution and then immediately removing them from the solution. The hexane was allowed to volatilize and the tetraisopropyl titanate was then exposed to a current of warm moist air to substantially convert all the tetraisopropyl titanate to the oxide of titanium.

The degree of protection given to the coated pellets was determined by their reactivity with an 18% methanol-dioxane solution, the rate of hydrogen evolution being a measure of the reactivity. For comparison of the degree of protection, some of the $LiAlH_4$ pellets were coated only with the aluminum metal and others were treated only with the sealant. The uncoated $LiAlH_4$ was 100% reacted after 5 to 6 minutes in 18% methanol-dioxane solution. The $LiAlH_4$ coated only with the aluminum metal and the $LiAlH_4$ treated only with the sealant were 100% reacted after 9 minutes. In contrast, the $LiAlH_4$ coated with the aluminum and sealed with the metal oxide was only 2% reacted after 9 minutes.

Example 2

Magnesium hydride particles having a particle size diameter on the order of 150 microns were coated by vacuum deposition with 8% aluminum metal by weight corresponding to a coating thickness of about 1 micron. The magnesium hydride particles were precooled to a temperature of approximately 10° C. and maintained at a temperature of between 10° C. and 180° C. during the coating operation. The aluminum metal coating was sealed in the same manner as Example 1.

The degree of protection given to the coated particles was determined by their reactivity with an aqueous chromic acid solution, the rate of hydrogen evolution being a measure of the reactivity. For comparison of the degree of protection, a portion of the magnesium hydride particles was coated only with the aluminum metal and another portion was treated only with the sealant. The uncoated $MgH_2$ and that treated with only the sealant were 100% reacted after approximately 140 minutes. The $MgH_2$ coated only with the aluminum metal was 90% reacted after 140 minutes. $MgH_2$ coated with aluminum and sealed with the metal oxide was only 65% reacted after 140 minutes.

The effectiveness of the aluminum metal and sealant coatings of the present invention is readily apparent. When the substrate is coated with only the sealant, insignificant protection is obtained with respect to the uncoated material. When the substrate is coated only with the aluminum metal, the protection is comparatively improved. While increasing the thickness of the aluminum metal coating will further improve the degree of protection, application of the sealant is necessary in order to achieve the maximum protection for a given thickness of the aluminum coating.

The required thickness of the aluminum film deposit depends on many factors such as particle size, particle shape, coating uniformity and the necessary amount of protection required for the substrate. For example, it is very desirable to use spherical particles for coating because a sphere has the smallest surface area-to-volume ratio and requires the minimum amount of metal for a given average coating thickness. If the particles to be coated are very small, or if they are very irregular and porous, a relatively large surface area must be coated and a relatively large amount of metal is needed for a given coating thickness as compared to large smooth spherical particles.

Thus, by means of the present invention, the physical and chemical surface properties of various materials may be modified to provide advantages which were heretofore extremely difficult, if not impossible, to achieve. The present invention has particular utility for encapsulating propellant ingredients which are to be mixed with other constituents to form rocket propellants. Propellant ingredients such as lithium aluminum hydride, magnesium hydride, lithium borohydride, hydrazine nitrate, decaborane and nitronium perchlorate, which are extremely sensitive to ambient conditions, can be rendered more compatible for use with other constituents and more stable mechanically.

In respect to other applications, wherever it is desired to reduce or control the reactivity, solubility, volatility, and adsorption of a particular substrate the process of the present invention can be utilized. For example, highly volatile insecticides may be coated to reduce or control the volatility and thus provide more efficient use of the insecticide. Fertilizers, for example, can be encapsulated to reduce or control the rate of solubility of the fertilizer.

While the specific embodiments of the invention have been described with respect to aluminum metal as the coating metal, numerous other coating materials may be utilized. For example, manganese, silver, chromium, cadmium, lead, beryllium, copper, boron, silicon, iron, zinc, magnesium, bismuth, titanium, thorium and zirconium are equally suitable. Any metal or metalloid which can be vaporized and deposited as a coating or film may be utilized.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. The process of forming a protective coating on a particular material comprising introducing said material into a vacuum chamber, vaporizing a metal and condensing the metal vapors to form a coating on said material, and treating said vacuum-deposited metal coating with a reactive organic metal compound of a sealing agent in liquid form, said treating comprising impregnating the pores of said metal coating with the liquid reactive organic metal compound, and reacting the compound to form a solid within the ports of the coating thereby plugging said pores.

2. The process of forming a protective coating on a particulate material comprising introducing said material into a vacuum chamber, vaporizing a metal and condensing the metal vapors to form a coating on said material and treating said vacuum-deposited metal coating with a reactive metal compound of a sealing agent in liquid form, said treating comprising impregnating the pores of said metal coating with the liquid reactive metal compound and reacting said compound to form an oxide of the metal of said reactive compound within the pores of the coating thereby plugging said pores.

3. The process of encapsulating a particulate material with a protective coating comprising introducing said material into a vacuum chamber, vaporizing a metal and condensing the metal vapors on said material, forming a solution of a sealing agent in a volatile solvent, applying the resulting solution to the pores of the metallic coating on said material, removing said solvent and treating said sealing agent to deposit an inert compound which substantially completely reduces the porosity of the metal coating.

4. The process of forming a protective coating on a substrate material comprising introducing said material into a vacuum chamber, vaporizing aluminum metal and condensing the metal vapors formed therefrom on said material, forming a solution of an alkyl titanate in an anhydrous volatile solvent, applying the resulting solution to the pores of the aluminum metal coating on said material, vaporizing said solvent and treating said alkyl titanate to form an oxide of titanium which substantially completely plugs the pores of the aluminum metal coating and together with said aluminum coating forms a protective coating on said material.

5. The process of encapsulating a reactive particulate material selected from the group consisting of lithium aluminum hydride, magnesium hydride, lithium borohydride, hydrazine nitrate, decaborane and nitronium perchlorate with a protective coating, comprising introducing said particulate material into a vacuum chamber, vaporizing aluminum metal and condensing the metal vapors formed therefrom on said material, forming a solution of tetraisopropyl titanate in hexane, impregnating the pores of the aluminum metal coating on said material with the resulting solution, vaporizing said hexane, exposing said tetraisopropyl titanate to warm moist air to substantially completely convert said tetraisopropyl titanate to an oxide of titanium which substantially completely reduces the porosity of the aluminum metal coating and together with said aluminum coating encapsulates said material.

6. The process of sealing vacuum-deposited metallic films comprising forming a solution of an alkyl titanate in an anhydrous volatile solvent, applying the resulting solution to the pores of the metal film, vaporizing said solvent and treating said alkyl titanate to form an oxide of titanium which substantially completely reduces the porosity of the metal film.

7. An encapsulated article comprising a reactive substrate having a protective coating thereon said protective coating comprising a film having a thickness of a few microns and selected from the group consisting of metals and metalloids which can be vaporized and condensed to form a film and a sealing agent impregnated in the pores of said metal film, said sealing agent being a metal oxide, and being a reaction product of a metal organic compound and water vapor.

8. A protective coating supported on a substrate, said protective coating comprising a metal film having a thickness of a few microns and a sealing agent impregnated in pores of said metal film, said sealing agent being a metal oxide of titanium and being the reaction product of an organic titanate.

9. Lithium aluminum hydride in particulate form and having a protective coating thereon, said protective coating comprising an aluminum metal film having a thickness of at least one micron and being sealed with titanium oxide.

10. Magnesium hydride in particulate form and having a protective coating thereon, said protective coating comprising an aluminum metal film having a thickness of at least one micron and being sealed with titanium oxide.

References Cited

UNITED STATES PATENTS

| | | | |
|---|---|---|---|
| 631,366 | 8/1899 | Golding | 117—160 |
| 998,341 | 7/1911 | Illingworth | 117—160 |
| 2,142,540 | 1/1939 | Veazey | 117—62 |
| 2,168,593 | 8/1939 | Veazey | 117—62 |
| 2,671,033 | 3/1954 | Waggoner | 117—160 |
| 2,710,817 | 6/1955 | Castor | 117—130 |
| 2,743,192 | 4/1956 | White | 117—160 |
| 2,867,546 | 1/1959 | MacNevin | 117—107 |
| 2,922,721 | 1/1960 | Tarkan et al. | 117—160 |
| 3,019,128 | 1/1962 | Smiley | 117—160 |
| 3,022,201 | 2/1962 | Quinn et al. | 117—160 |
| 3,070,469 | 12/1962 | Jenkin | 149—5 |
| 3,120,459 | 2/1964 | Coates et al. | 149—5 |

L. DEWAYNE RUTLEDGE, *Primary Examiner.*

ROGER L. CAMPBELL, LEON D. ROSDOL, CARL D. QUARFORTH, REUBEN EPSTEIN, *Examiners.*

R. D. MORRIS, W. T. HOUGH, M. R. DINNIN, *Assistant Examiners.*